United States Patent [19]

Duncanson

[11] Patent Number: 5,231,649
[45] Date of Patent: Jul. 27, 1993

[54] METHOD AND APPARATUS FOR DYNAMIC BANDWIDTH ALLOCATION IN A DIGITAL COMMUNICATION SESSION

[75] Inventor: Jay P. Duncanson, San Francisco, Calif.

[73] Assignee: Ascend Communications, Inc., San Francisco, Calif.

[21] Appl. No.: 742,864

[22] Filed: Aug. 8, 1991

[51] Int. Cl.⁵ .................................... H04L 29/04
[52] U.S. Cl. .................................... 375/38; 370/84; 370/112
[58] Field of Search .................. 370/84, 112, 118; 375/8, 38, 121

[56] References Cited

U.S. PATENT DOCUMENTS

| | | | |
|---|---|---|---|
| 4,759,017 | 7/1988 | Allan et al. | 370/84 |
| 4,775,987 | 10/1988 | Miller | 375/38 |
| 4,805,167 | 2/1989 | Leslie et al. | 370/84 |
| 4,825,434 | 4/1989 | Shaio | 370/80 |
| 4,864,567 | 9/1989 | Giorgio | 370/118 |
| 4,888,765 | 12/1989 | Dyke | 370/95.1 |
| 4,893,305 | 1/1990 | Fernandez et al. | 370/84 |
| 4,899,337 | 2/1990 | Hirai | 370/80 |
| 4,903,261 | 2/1990 | Baran et al. | 370/94.2 |
| 4,980,886 | 12/1990 | Bernstein | 370/80 |
| 4,980,897 | 12/1990 | Decker | 375/38 |
| 4,987,570 | 1/1991 | Almond et al. | 370/84 |
| 4,996,685 | 2/1991 | Farese et al. | 370/58.1 |
| 5,014,261 | 5/1991 | Shinbashi et al. | 370/16 |
| 5,058,133 | 10/1991 | Duncanson et al. | 375/38 |
| 5,065,396 | 12/1991 | Castellano et al. | 370/112 |

*Primary Examiner*—Benedict V. Safourek
*Attorney, Agent, or Firm*—Limbach & Limbach

[57] ABSTRACT

A dynamic and automatic method and apparatus for changing the bandwidth of a digital communication session is disclosed. The communication session uses a plurality of channels for transmitting digital data between a first location and a second location. The rate of data or non-data characters in the transmitting digital data stream is detected. A utilization parameter is calculated by dividing the non-data rate by the overall transmission data rate. The number of the plurality channels is changed to maintain the utilization parameter in response to changes in the data rate.

12 Claims, 3 Drawing Sheets

METHOD AND APPARATUS FOR DYNAMIC BANDWIDTH ALLOCATION IN A DIGITAL COMMUNICATION SESSION

TECHNICAL FIELD

The present invention relates to a method and an apparatus for use in a digital communication session. More particularly, the present invention relates to a method and an apparatus which can change dynamically the bandwidth of a digital communication session.

BACKGROUND OF THE INVENTION

Digital communication is well known in the art. One well known communication standard which is proposed and in some areas is being implemented is the ISDN network standard. The ISDN network standard is a digital communication protocol for a public network (such as one operated by local telephone companies). In the United States, the ISDN network is a digital communication network operating at the rate of 64 kilobits per second per channel.

Computers are well known in the art. Typically, however, they operate at a much higher frequency than a single channel of a public communication network. Thus, for example, computers can store and retrieve at the rate of millions of bits per second.

As it becomes increasingly desirable to connect computers directly onto public digital communication networks, such as an ISDN network, methods and apparatuses must be provided to interface the computer with the communication network. One prior art technique is disclosed in U.S. Pat. No. 4,775,987. In that patent, a single digital data stream from a source (such as a computer) is supplied to a distributor which supplies a portion of the data cyclically onto a plurality of channels. Each of the channels operates at a rate slower than the rate of the single stream of data supplied to the distributor. In this manner, the transmission of data over the plurality of channels, in total, is or exceeds the rate of the single stream of digital data from the source to the distributor. In that patent, however, once a communication session has begun, the number of channels used for the communication session is fixed and is not varied until the communication session is terminated.

In U.S. Pat. No. 4,805,167, a technique is disclosed whereby once a communication session has begun, the number of channels used for the communication session can be varied. However, it is believed that this technique depends upon the supplier of the digital data to inform its receiver to change the number of channels during the communication session. Accordingly, it is desirable to provide an automatic method and apparatus for dynamically changing the bandwidth or the number of channels in a digital communication session.

Other prior art include: U.S. Pat. Nos.: 4,759,017; 4,899,337; 4,893,305; 4,888,765; 4,864,567; 4,825,434; 4,980,886; 4,987,570; and 4,903,261.

SUMMARY OF THE INVENTION

The present invention relates to a method and an apparatus for transmitting and receiving a single digital data stream between a first unit at a first location and a second unit at a second location in a single communication session. The units communicate via a plurality of channels having a total transmission capacity rate. The first unit has means for receiving the single digital data stream and for transmitting the single digital data stream by cyclically distributing the single digital data stream along the plurality of channels in the same order in each cycle. The second unit has means for receiving the data from each of the channels and for reconstituting the data received from the plurality of channels into the transmitted single digital data stream. The method and apparatus of the present invention comprises measuring the rate of data in the single digital data stream supplied to the first unit. A utilization parameter is calculated. The number of channels is changed in response to the utilization parameter.

DETAILED DESCRIPTION OF THE DRAWINGS

Figure 1:
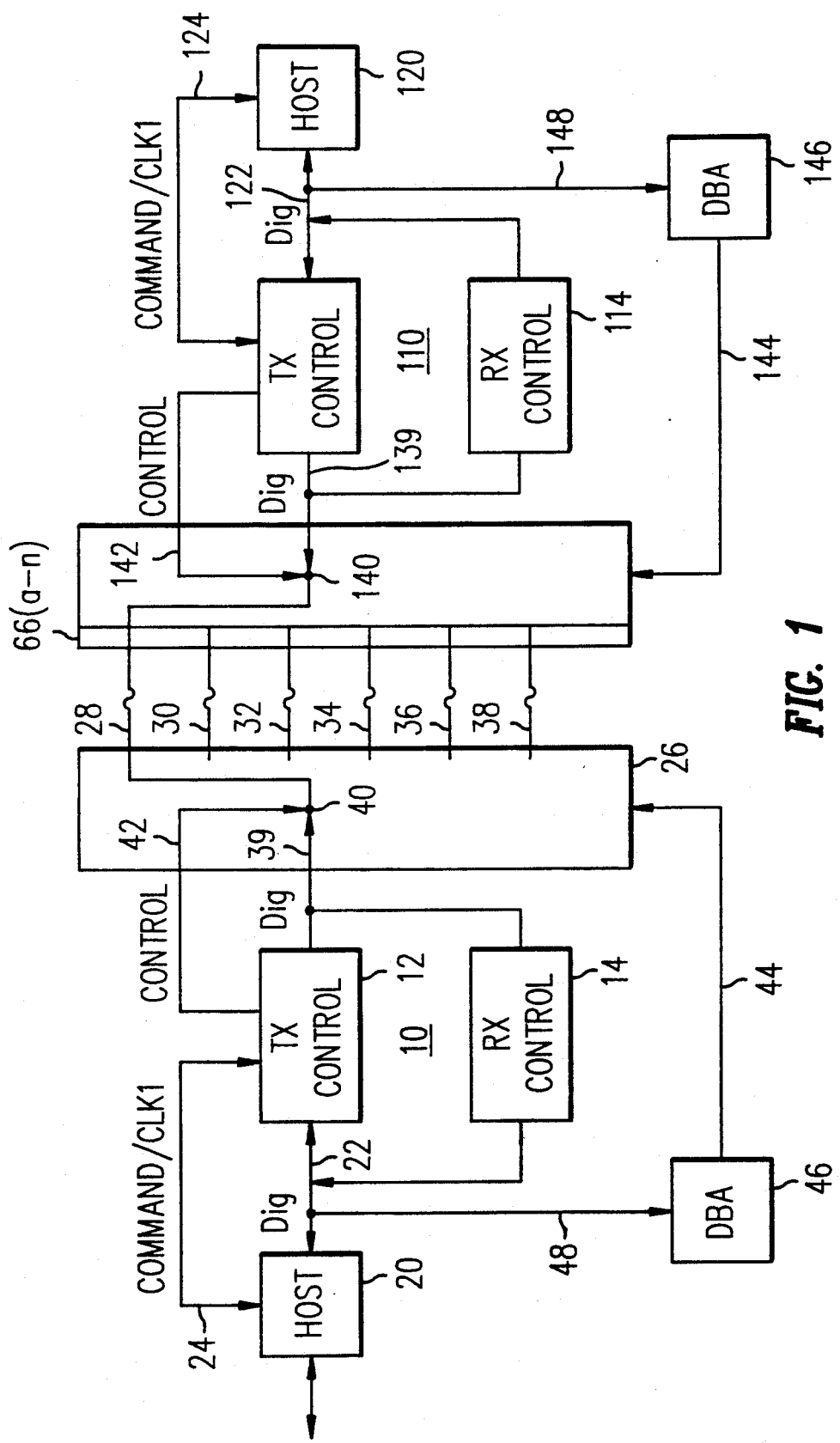
FIG. 1 is a block diagram of one embodiment of a communication system incorporating the dynamic bandwidth allocation apparatus of the present invention, wherein the system is adapted for transmitting and receiving data over a plurality of channels from one unit at a first location to a second like unit at another location.

Referring to FIG. 1 there is shown a block diagram of an embodiment of a communication system 10. The communication system 10 is shown schematically as comprising a TX control unit 12 (for transmission data) and an RX control unit 14 (for receiving data). The TX control unit 12 is connected to a host 20 via a first digital data link 22. The host 20, which is a source of digital data, such a computer, supplies a single stream of digital data over the first digital data link 22 to the TX control unit 12. The TX control unit 12 and the host 20 are also connected by the command link 24. The command link 24 supplies the command signals from the TX control unit 12 to the host 20 and visa versa, and includes signals such as CLK1 clock signal, etc.

In the embodiment shown in FIG. 1, the single stream of digital data from the host 20 comprises packets of data as well as packets of "non-data" or "padding characters" or "flags". For example, many synchronous data protocols, such as SDLC, HDLC, or BISYNC, send data over a synchronous connection as packets or characters separated by non-data packets or "flags" or "padding characters". Since the amount of data to be transmitted across a channel at any particular time may not exactly equal the amount of bandwidth of the channel, these "flags" or "padding characters" are used to occupy the time slots in the bandwidth not occupied by actual data values. Thus, for example, in HDLC protocol, a "flag" has the data value of 7E (hexadecimal).

The single stream of digital data from the host 20 is received by the TX control unit 12 at the clock rate of CLK1 and is supplied to a distributor 26 via a second digital data link 39. The distributor 26 is connected to a plurality of communication N channels 28, 30, 32, 34, 36 and 38. Each of the channels is subject to a delay, with D as the maximum delay of all the channels, relative to each other. As will be appreciated, although only six channels are shown, the invention is not so limited and can be used with any number of plurality of channels. The data is supplied from the TX control unit 12 to a switch 40 within the distributor 26. The switch 40 is controlled by the TX control unit 12 through a control link 42. The function of the switch 40 is to cyclically place data from the TX control unit 12 and ultimately from the host 20 over each of the plurality of channels (28–38).

The system 10 is particularly suited for interfacing with an ISDN network. Hereinafter the system 10 will be described with respect to its connection to and operation with an ISDN network. However, it should be apparent to those skilled in the art that the invention is not so limited and can be used with any type of analog or digital communication network.

The system 10 also comprises an RX control unit 14 which receives digital data from the switch 40 reassembled into a single stream of digital data. The data from the RX control unit 14 is then supplied to the first digital link 22 which is then supplied to the host 20.

The apparatus 10 is connected to the distributor 26 located at a first location. The plurality of channels (28–38) connect the system 10 at the first location to a second location. At a second location, a substantially like system 110 is located. Similar to the system 10, the system 110 comprises a TX control unit 112, connected to the switch 140, and controlling the switch 140 through a control link 142. The TX control unit 112 is also connected to a second host 120 via a data link 122. The host 120 and the TX control unit 112 also communicate through a command link 124. In addition, data from the second distributor 126 is received by the RX control unit 114 and is supplied to the data link 122 to the host 120.

As will be appreciated from a review of FIG. 1, each of the systems 10 and 110 can transmit data to the other like unit and simultaneously receive data from the other like unit in a full duplex communication session. Thus far, these components are well known in the art and a detailed description of these components can be found in the U.S. Pat. No. 5,058,133, issued on Oct. 15, 1991, assigned to the present assignee, and is incorporated by reference.

Referring to FIG. 1, there is also shown a dynamic bandwidth allocator (DBA) 46 of the present invention. The DBA 46 receives the digital data stream from the host 20 along its digital input bus 48. As will be seen, in response to changes in the rate of transmission of data signal, in the digital signal, from the host 20 to the TX control unit 12, the DBA 46 outputs a control signal 44 which is supplied to the distributor 26. The control signal 44 causes the distributor 26 to change the number of channels over which the switch 40 cyclically distributes the digital signal supplied thereto. Thus, with the DBA circuit 46 of the present invention, the system 10 can dynamically and automatically change the number of channels over which its digital signal would be transmitted. By having an efficient and automatic means of dynamically changing the number of channels used in a communication session, the system 10 will perform more efficiently. Similarly, a like DBA unit 146 is located at the second location and controls the system 110.

Figure 2:
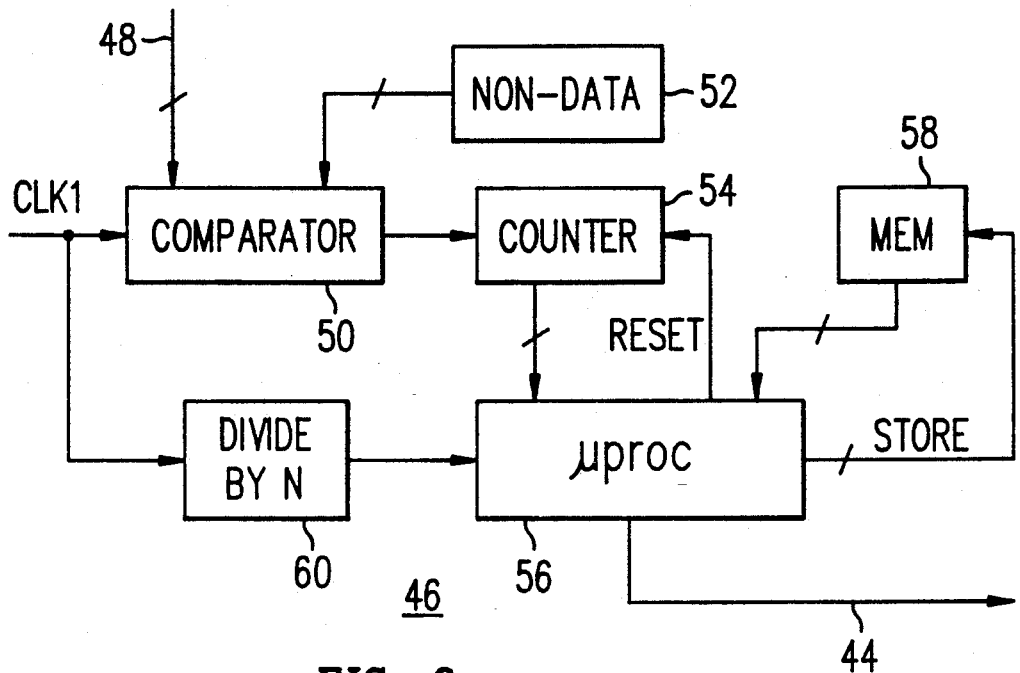
FIG. 2 is a schematic diagram of a dynamic bandwidth allocator, which is a portion of the apparatus shown in FIG. 1.

Referring to FIG. 2 there is shown a schematic block diagram of one embodiment of the DBA circuit 46. The DBA circuit 46 comprises a comparator 50 which receives the digital signal from the input bus 48. The comparator 50 also receives a signal representative of non-data stored in a non-data register 52. At every clock cycle from the CLK1 clock signal (which synchronizes the data and non-data signals from the host 20 to the TX control unit 12), the comparator 50 compares the digital signal from the input bus 48 to the signal from the non-data register 52 and outputs a signal supplied to the counter 54. In the event the two signals are equal, a pulse is outputted by the comparator 50 and the counter 54 increments its count.

Periodically, (as determined by the Divide By N circuit 60) a microprocessor 56 receives the output from the counter 54 and compares the contents of the counter 54 to a value stored in the memory 58. At the time of the comparison, the microprocessor 56 would also cause the counter 54 to be reset. In response to the comparison the microprocessor determines if a change in the number of channels is desirable, In that event, a signal is sent along the output bus 44 to the distributor 26. In addition, a new value is outputted by the microprocessor 56 and is stored in the memory 58. In the event the microprocessor 56 determines that no output signal should be sent along the output bus 44, thereby maintaining the same number of channels, then no new data would be outputted by the microprocessor 56 to be stored in the memory 58.

Specifically, in the preferred embodiment, the method of the present invention is as follows. The comparator 50 measures the rate at which non-data characters occur in the digital stream 48. An efficiency parameter is calculated by dividing the rate of the non-data characters by the rate of the total digital stream. The number of channels is changed in response to the amount of non-data characters in the digital stream. In addition to the algorithm set forth herein (i.e. calculation of an efficiency parameter), there can be a number of different algorithms used to act upon the measurements taken from the data stream.

An example of the foregoing operation is as follows. Assuming that 5 channels of 64 kilobits per second channel each, are in operation. Thus, the total digital bandwidth from the host 20 to the TX control unit 12 is at the rate of 320KB/sec. Every 1/320k second, a clock signal CLK1 compares the digital signal to the non-data character 52. If the resultant comparison is true, i.e. a non-data character is in that bandwidth location, the counter 54 is incremented. The Divide By N circuit 60 would also count the number of CLK1 clock signals. For example, after 320 CLK1 clock signals, the Divide By N circuit 60 sends a pulse to the microprocessor 56. This would represent a time increment of 1/1000 sec. During this time period, 320 synchronous characters (of data and non-data) will have been transmitted. Thus the memory 58 would have stored therein the value of 320. The number of non-data characters stored in the counter 54 is compared to the total number of characters stored in memory 58.

If the results of that comparison, i.e. the ratio between the non-data characters and the total characters is very very low, e.g. 1/320, then the microprocessor 56 would issue a command along its output signal 44 to the distributor 26 to increase another channel. For maximum efficiency, the ratio should be a non-zero number maintained as close to zero as possible. If the results of the ratio shows that the ratio is greater than 64/320, then the microprocessor 56 would issue a command along its output bus 44 to the distributor 26 to shut down one of the communication channels. Thus, one channel worth of non-data is in the counter 54 indicating that one channel can be shut down for greater efficiency.

Figure 3:
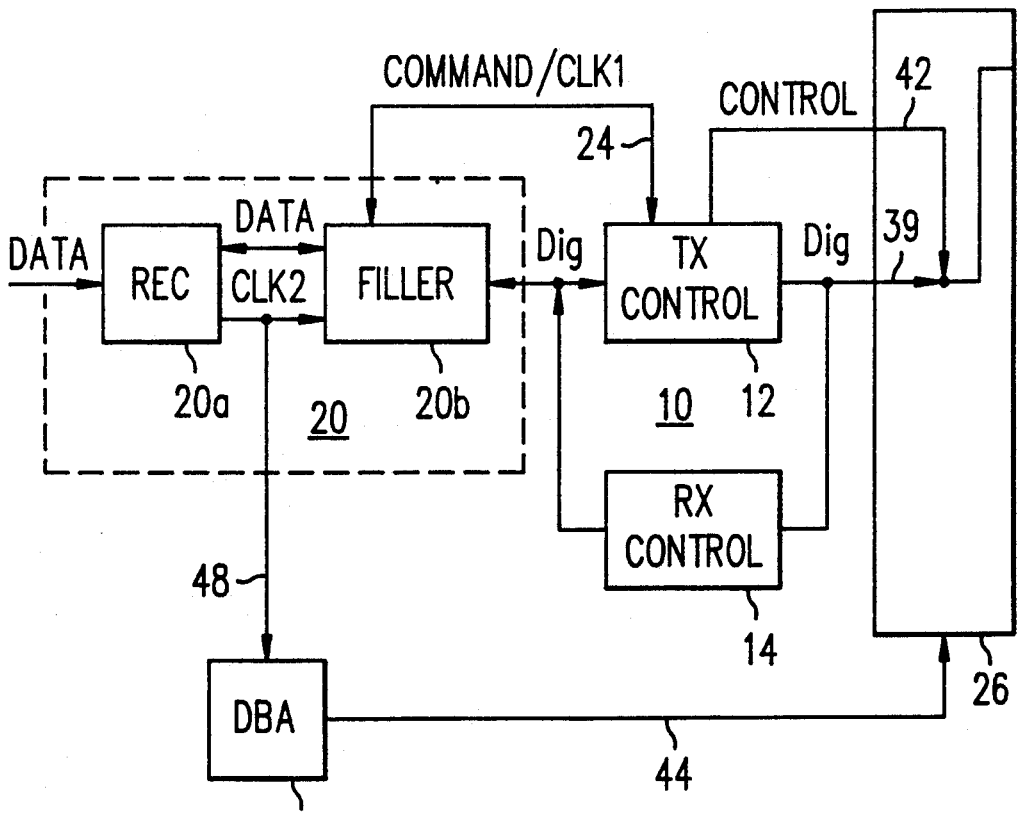
FIG. 3 is a block diagram of another embodiment of a portion of a system for transmitting and receiving data over a plurality of channels, incorporating another embodiment of the dynamic bandwidth allocator of the present invention.

Referring to FIG. 3 there is shown a schematic diagram of another embodiment of a system 10 employing the DBA circuit 46 of the present invention. The system 10 shown in FIG. 3 is substantially identical to the system 10 shown in FIG. 1. The only difference is that the host 20 comprises a receiving unit 20a and a filler unit 20b. The receiving unit 20a interfaces with an external source of digital data or can be the source of digital data. However, the receiving unit 20a supplies only digital signals representative of data characters to the filler unit 20b accompanied by its clock signal CLK2. The filler unit 20b receives the command and clock signal CLK1 along the command link 24 from the TX control unit 12. In response to the command and CLK1 clock signal, the filler unit 20b supplies the digital signal comprising of the data characters from the REC unit 20a and the non-data or flag characters in order that the rate of the transmission supplied to the TX control unit 12 is maintained at the CLK1 clock signal rate.

Since the digital signal from the REC unit 20a to the filler unit 20b is always transmitting data characters, the DBA circuit 46 is adapted to receive the clock signal CLK2 which accompanies the data character transmission. In response to the data character transmission, the DBA circuit 46 sends an output signal along the output bus 44 to the distributor 26.

Figures 4, 5:
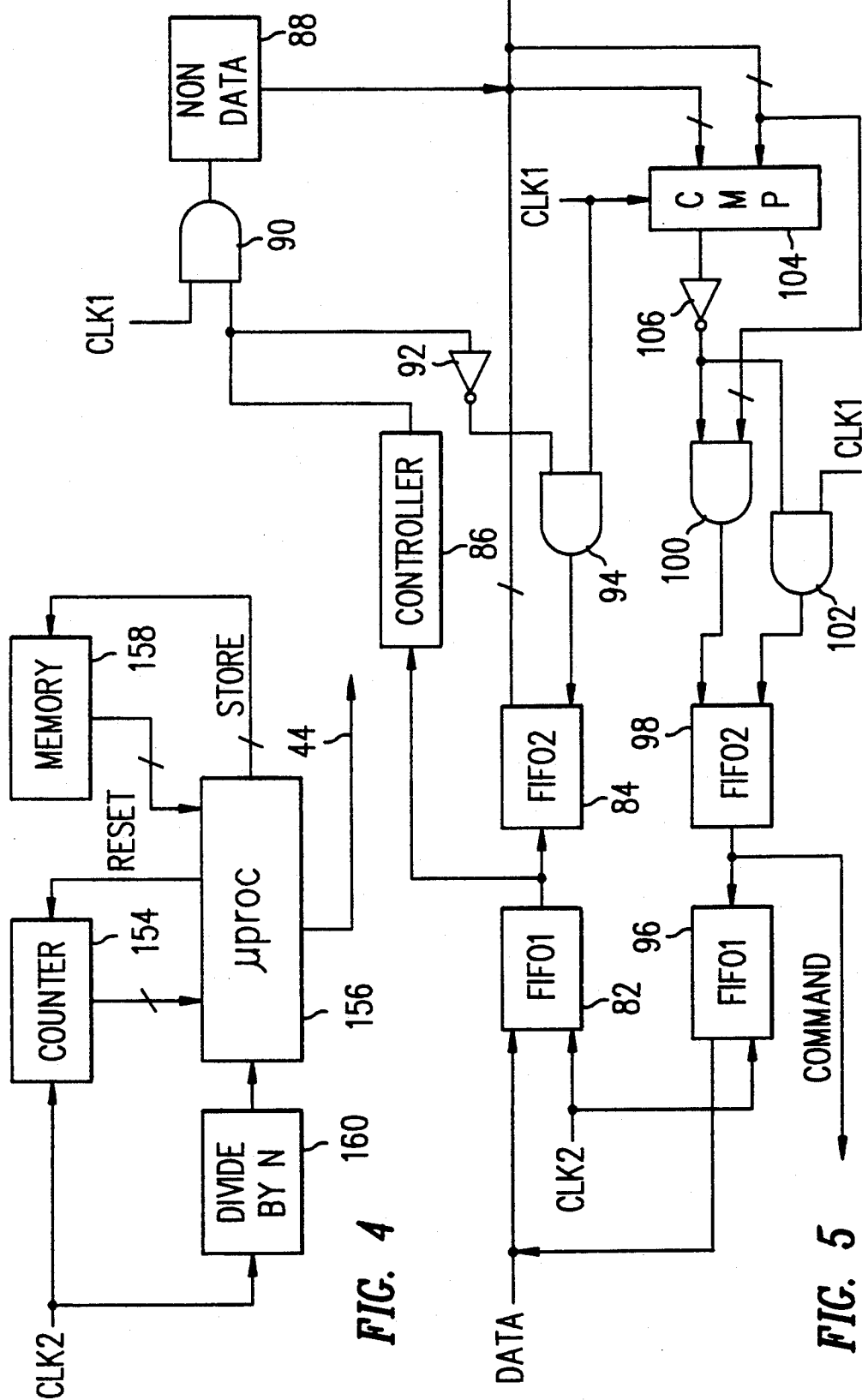
FIG. 4 is a schematic block diagram of the dynamic bandwidth allocator shown in FIG. 3.
FIG. 5 is a schematic diagram of the filler circuit portion of the system shown in FIG. 3.

Referring to FIG. 4 there is shown in greater detail the DBA circuit 46 shown in FIG. 3. The DBA circuit 46 receives a clock signal CLK2 from the REC unit 20a. Each clock signal CLK2 is clocked into a counter 154. Similarly, a Divide By N circuit 160 is also provided to count down the clock signal CLK2. A microprocessor 156 receives the output of the Divide By N circuit 160 and in response to that signal, reads the contents of the counter 154. The microprocessor 156 also then resets the counter 154. Finally, the microprocessor 156 reads the contents of the memory 158 and makes a comparison between the contents of the memory 158 and the contents of the counter 154. In response to that comparison, if the number of channels is to be changed, an output signal is supplied on the output bus 44. In addition, a new value is stored by the microprocessor 156 into the memory 158.

The theoretical basis for the operation of the DBA circuit 46 shown in FIG. 3 is the same as previously described. However, since the DBA circuit 46 is continually monitoring characters which contain only data, the DBA circuit 146 measures the rate of data. A utilization parameter is calculated in accordance with: (TOTAL RATE−DATA RATE)/(TOTAL RATE). The number of plurality of channels is changed in response to changes in the data rate, to maintain the utilization parameter as close to zero as possible.

Similar to the embodiment shown in FIG. 1, however, instead of analyzing the number of non-data characters or flag characters, the DBA circuit 146 shown in FIG. 3 analyzes the actual number of data characters. Thus, the utilization parameter takes into effect the total rate minus the data rate which is the rate of the non-data characters. The two equations are mathematically equivalent.

Finally, referring to FIG. 5, there is shown one embodiment of the filler unit 20b. Data characters from the REC unit 20a is supplied to a first of a double buffered FIFOs. The data characters are supplied to the first FIFO 82 which are then supplied to the second FIFO 84. The data characters are clocked into the first FIFO 82 and second FIFO 84 at the clock signal rate of CLK2. When the second FIFO 84 is filled, a signal is sent to the controller 86 indicating that the contents in the second FIFO 84 are buffered and are ready to be read out. Since we assume that the clock signal CLK1 always operates at a faster rate than the clock signal CLK2, the controller 86 in response to the second FIFO 84 being filled will go low. This causes the AND gate 90 to be inhibited and non-data 88 is no longer transmitted to the TX control 12. However, with the controller 86 outputting a low signal, the inverter 92 outputs a high. This causes the AND gate 94 to be enabled thereby causing the contents of the second FIFO 84 to be read out by the CLK1 clock signal. Again, when a sufficient number of data characters is read out from the second FIFO 84, and when data characters no longer exceed the storage contents of second FIFO 84, the controller 86 would then go high. This would cause the AND gate 90 to be enabled, causing non-data 88 to be sent out to the TX control unit 12 by the CLK1 clock signal. The filler unit 20b described herein can be a standard HDLC type UART hardware commercially available in chip form.

The receiving function is similar to the foregoing. Digital signal comprising of data characters and non-data characters are from the RX control unit 14. Each digital signal is clocked into the comparator 104 by the clock signal CLK1. Each digital signal is compared to the non-data flag stored in the register 88. If the incoming packet is a non-data, the results of the comparator 104 would be high. Inverting the high signal through an inverter 106 would cause the AND gate 100 to be disabled. This would prevent the digital signal from being stored into the second FIFO 98. However, if the digital signal is a character signal, the result of the comparator 104 would be low. This would be inverted by the inverter 106 causing the AND gate 100 to be enabled thereby causing the digital signal to be passed into the second FIFO 98. The AND gate 102 would also be enabled causing the clock signal CLK1 to gate the digital signal into the second FIFO 98. When the first FIFO 96 is filled, a command signal is then issued to the REC unit 20a to cause it to issue the CLK2 signal to read out the contents of the first FIFO unit 96.

There are many advantages to the method and apparatus of the present invention. First and foremost is that a simple and efficient dynamic and automatic means and method for determining and maintaining the efficiency of a network can be accomplished. This is accomplished by observing the data stream and measuring the density of the data stream. The number of channels for the bandwidth of a digital communication session can be dynamically changed in that session in response to the measurement of the density. As used herein, the term density can mean any one of the following measurements: ratio of data to total, data to non-data, non-data to total, and non-data to data.

What is claimed is:

1. A method of synchronously transmitting and receiving a single digital signal between a first unit at a first location and a second unit at a second location, in a single communication session, wherein said digital signal contains data signals and non-data signals, the density of data signals in said digital signal (hereinafter "data rate") varying with time, wherein said units are connected by a plurality of channels, having a total transmission capacity rate (hereinafter: "total rate"), wherein said first unit has means for receiving the single digital signal, means for transmitting said single digital signal by cyclically distributing the single digital signal along the plurality of channels in the same order in each cycle, and wherein said second unit has means for receiving the digital signal from each of said channels, means for reconstituting the digital signals received from said plurality of channels, by said receiving means, into the transmitted single digital signal, wherein said method comprising:

measuring the data rate; and changing the number of said plurality of channels in response to changes in said data rate in said total rate.

2. The method of claim 1 wherein said measuring step further comprises:

calculating a utilization parameter in accordance with (total rate − data rate)/(total rate); and wherein said changing step further comprises:

changing the number of said plurality of channels in response to said utilization parameter calculated.

3. The method of claim 2 wherein said changing step further comprises:

changing the number of said plurality of channels to maintain said utilization parameter as close to zero as possible, in response to changes in said data rate.

4. An apparatus for synchronously transmitting and receiving a single digital signal between a first unit at a first location and a second unit at a second location, in a single communication session, wherein said digital signal contains data signals and non-data signals, the density of data signals in said digital signal (hereinafter: data rate) varying with time, wherein said units are connected by a plurality of channels, having a total transmission capacity rate (hereinafter: "total rate"), wherein said first unit has means for receiving the single digital signal, means for transmitting said single digital signal by cyclically distributing the single digital signal along the plurality of channels in the same order in each cycle, and wherein said second unit has means for receiving the digital signal from each of said channels, means for reconstituting the digital signals received from said plurality of channels, by said receiving means, into the transmitted single digital signal, wherein said apparatus comprising:

means for measuring said data rate; and means for changing the number of said plurality of channels in response to changes in said data rate in said total rate.

5. The apparatus of claim 4 wherein said measuring means further comprises:

means for calculating a utilization parameter in accordance with (total rate − data rate)/(total rate); and wherein said changing means further comprises:

means for changing the number of said plurality of channels in response to said utilization parameter calculated by said calculating means.

6. The apparatus of claim 5 wherein said changing means further comprises:

means for changing the number of said plurality of channels to maintain said utilization parameter as close to zero as possible, in response to changes in said data rate.

7. A method of synchronously transmitting and receiving a single digital signal between a first unit at a first location and a second unit at a second location, in a single communication session, wherein said digital signal contains data signals and non-data signals, the density of non-data signals in said digital signal (hereinafter: non-data rate) varying with time, wherein said units are connected by a plurality of channels, having a total transmission capacity rate (hereinafter: "total rate"), wherein said first unit has means for receiving the single digital signal, means for transmitting said single digital signal by cyclically distributing the single digital signal along the plurality of channels in the same order in each cycle, and wherein said second unit has means for receiving the digital signal from each of said channels, means for reconstituting the digital signals received from said plurality of channels, by said receiving means, into the transmitted single digital signal, wherein said method comprising:

measuring the non-data rate; and changing the number of said plurality of channels in response to changes in said non-data rate in said total rate.

8. The method of claim 7 wherein said measuring step further comprises:

calculating an efficiency parameter in accordance with (non-data rate)/(total rate); and wherein said changing step further comprises:

changing the number of said plurality of channels in response to said efficiency parameter calculated.

9. The method of claim 8 wherein said changing step further comprises:

changing the number of said plurality of channels to maintain said efficiency parameter as close to zero as possible, in response to changes in said non-data rate.

10. An apparatus for synchronously transmitting and receiving a single digital signal between a first unit at a first location and a second unit at a second location, in a single communication session, wherein said digital signal contains data signals and non-data signals, the density of non-data signals in said digital signal (hereinafter: non-data rate) varying with time, wherein said units are connected by a plurality of channels, having a total transmission capacity rate (hereinafter: "total rate"), wherein said first unit has means for receiving the single digital signal, means for transmitting said single digital signal by cyclically distributing the single digital signal along the plurality of channels in the same order in each cycle, and wherein said second unit has means for receiving the digital signal from each of said channels, means for reconstituting the digital signals received from said plurality of channels, by said receiving means, into the transmitted single digital signal, wherein said apparatus comprising:

means for measuring the non-data rate; and means for changing the number of said plurality of channels in response to changes in said non-data rate in said total rate.

11. The apparatus of claim 10 wherein said measuring means further comprises:

means for calculating an efficiency parameter in accordance with (non-data rate)/(total rate); and wherein said changing means further comprises:

means for changing the number of said plurality of channels in response to said efficiency parameter calculated by said calculating means.

12. The apparatus of claim 11 wherein said changing means further comprises:

means for changing the number of said plurality of channels to maintain said efficiency parameter as close to zero as possible, in response to changes in said non-data rate.

* * * * *